Aug. 8, 1950       F. F. LÁZAGA       2,517,897
HYDRAULIC DIFFERENTIAL TRANSMISSION

Filed May 28, 1946       2 Sheets-Sheet 2

INVENTOR
Francisco F. Lázaga

Patented Aug. 8, 1950

2,517,897

UNITED STATES PATENT OFFICE 2,517,897

HYDRAULIC DIFFERENTIAL TRANSMISSION

Francisco F. Lázaga, La Vibora, Habana, Cuba

Application May 28, 1946, Serial No. 672,858

9 Claims. (Cl. 74—688)

1

My invention relates to improvements in the operation of the low speed gear drive, the direct drive coupling, and the provision of a reverse drive in the "Progressive speed ratio transmission," as shown in my United States Patent 2,309,-912 of February 2, 1943.

My invention may be described as improvements to be used in connection with the above mentioned patent, whereby the units comprising the torus fluid members A—C and D—B are substituted for two improved torus fluid units, the addition of two conventional type friction clutches, and the provision of additional parts to produce a reverse drive.

The objects of my invention are: first, to provide a device which will maintain all the gears engaged; second, a device which will regulate the power and motion transmitted from a driving shaft to a transmission shaft; third, to provide means so that the transmitted motion be in the same direction as the initial motion; fourth, to provide means to reverse the direction of the initial motion; fifth, to provide means so that the motion transmitted indirect, be without the running of gears; sixth, to provide means to produce a continuous intermediate gear ratio changing effect, from a low speed gear to a high speed gear ratio, by the combined action of two pairs of torus fluid members with a friction clutch unit, each; seventh, to provide means to have the entire device supported by a central shaft.

Other objects and advantages will be understood from the following description. I have attained these objects by means of the mechanism illustrated in the accompanying drawings, in which.

Similar numerals and letters refer to the same or similar parts throughout the different figures.

Figure 1:
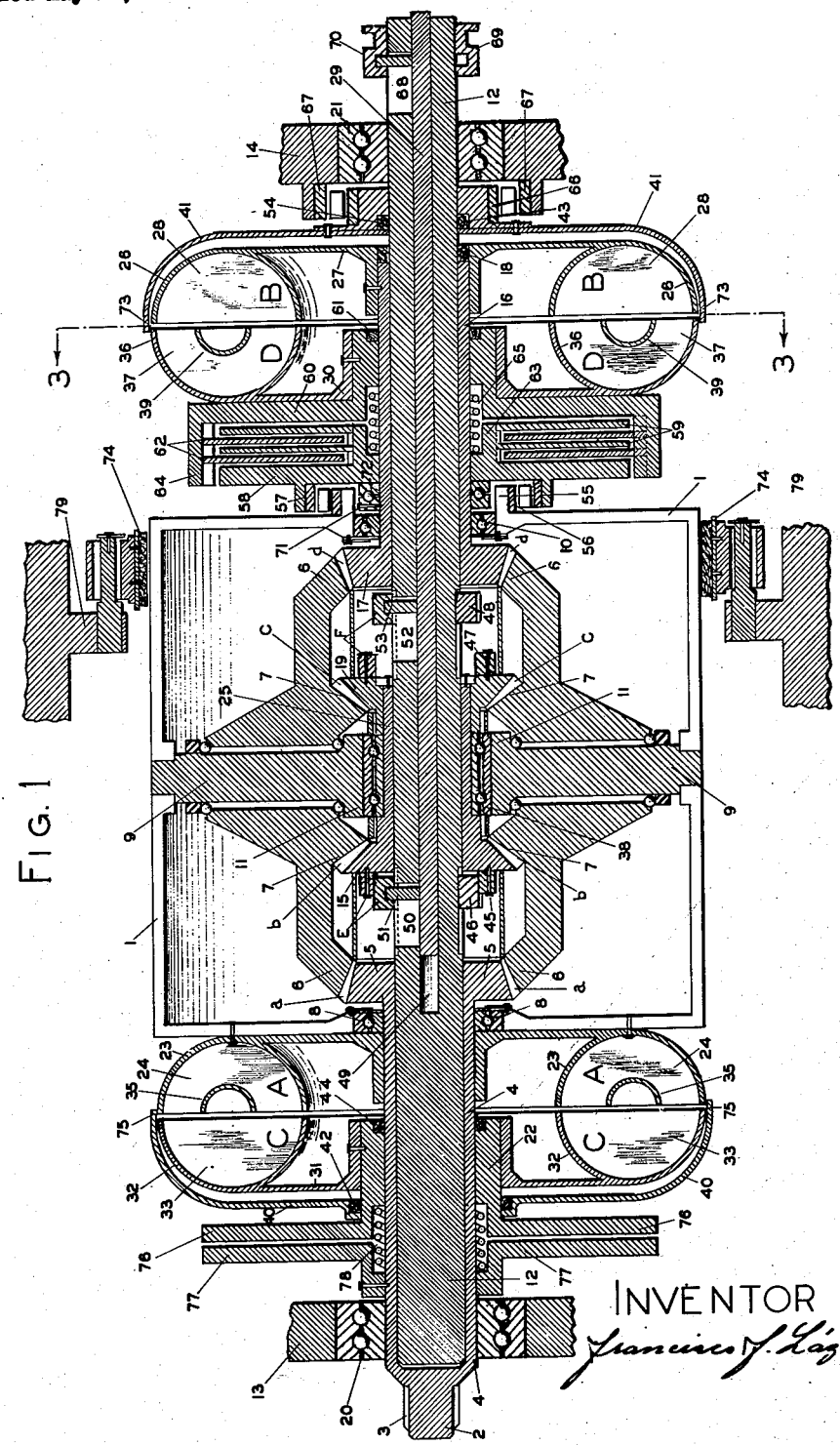
Fig. 1 shows a horizontal section through the transmission device.

Referring to parts shown in Fig. 1, numeral 1 is used to designate a rigid case of circular cross-section, which is adapted to rotate about an axis, carrying bevel gears rotatable on axes arranged radially to said axis, as hereinafter set forth.

Numeral 2 is a driving shaft provided with splines 3, to be coupled to the motor shaft, not shown in the drawings.

A tubular extension 4 of drive shaft 2, carries a bevel pinion 5, which is in mesh at points $a$ with bevel gears 6. Other bevel gears 7 of lesser diameter are attached on the inner side of said gears 6 for rotation therewith.

2

Numeral 9 designates radial axles embedded at one of their ends in the case 1 and attached at their other ends to a ring 11, through which a short tubular shaft 25 passes.

A bearing 38 is located between ring 11 and tubular shaft 25.

A transmission shaft 12 passes through the tubular shaft 25 into the tubular extension 4 of drive shaft 2, wherein it is supported.

A forward drive bevel pinion 15 is attached to one end of the tubular shaft 25 and is in mesh with gears 7 at points $b$.

A reverse drive bevel pinion 19 is rotatably mounted upon the other end of tubular shaft 25 and is in mesh with gears 7 at points $c$.

The gearing points $a$ and $b$ are on the same side with regard to axles 9.

A tubular extension shaft 16, concentric with shaft 12 extending out of case 1, and independently rotatable upon shaft 12, is provided with oil retainer 18, and carries a bevel pinion 17 which is in mesh with gears 6 at points $d$. Gearing points $c$ and $d$ are at the opposite side from gearing points $a$ and $b$ with regard to axles 9.

At one end case 1 is supported upon tubular extension 4 of drive shaft 2, through sealed-bearing 8. At its other end said case 1 rests upon tubular shaft 16, through sealed-bearing 10.

A member 45 of a conventional type synchromesh-clutch is attached to pinion 15. The other member 46 of this synchromesh-clutch is splined upon shaft 12, along which it will slide longitudinally. I shall call this, clutch unit E.

A member 47 of a conventional type synchromesh-clutch is attached to pinion 19. The other member 48 of this synchromesh-clutch is splined upon shaft 12, along which it will slide longitudinally. I shall call this, clutch unit F.

A longitudinal central bore 49, is provided in the shaft 12, extending from the splined portion of the clutch unit E to its rear end, wherein a clutch operating rod 29 will slide longitudinally.

A slot 50 is provided in shaft 12, along the splined portion of the clutch unit E, and extending radially into the central bore 49.

A clutch operating yoke 51, attached to rod 29 connects the clutch member 46 through slot 50, whereby the clutch unit E may be engaged or disengaged.

A slot 52 is provided in shaft 12, along the splined portion of the clutch unit F, and extending radially into the central bore 49.

A clutch operating yoke 53, attached to rod 29 connects the clutch member 48 through slot 52, whereby the clutch unit F may be engaged or disengaged.

A slot 68 is provided in shaft 12, behind the chassis support 14 and extending radially into the central bore 49.

A rod operating sleeve 69, provided with an internal circular groove and an external circular groove, is independently mounted on shaft 12, upon which it will slide longitudinally.

A rod operating yoke 70 is attached to rod 29, and extends into the internal groove of the operating sleeve 69 through slot 68, to provide the engagement or disengagement of the clutch units E and F, whenever the operating sleeve 69 is moved forwards or backwards.

An extension 55 of case 1, rigidly supports the internal member 56 of a conventional type over-running clutch. The external member 57 of this over-running clutch is attached on the back of a clutch driving pressure plate 58, which is independently rotatable upon tubular shaft 16 and is located beside case extension 55. The hub 63 of this pressure plate 58 is provided with longitudinal splines on its external surface.

Clutch driving discs 59 have recesses cut in their inner rim that mesh with and slide on the corresponding longitudinal splines on the external surface of the pressure plate hub 63 to rotate therewith.

The over-running clutch unit 56—57 will hold case 1 to the pressure plate 58 in one turning direction and releases it in the opposite turning direction.

A clutch driven pressure plate 60 is attached to torus member support 30, which is independently mounted upon tubular shaft 16 and is located beside pressure plate 58. This pressure plate 60 is provided with a projecting flange 64, with longitudinal splines in its internal surface, wherein driven discs 62, which are notched on the outer edges will engage with and slide along the longitudinal splines, to rotate therewith. The driven discs 62 and driving discs 59 are located alternately beside each other, and each set of discs will rotate together with its own pressure plate, 58 and 60.

An oil retainer 61 is provided between pressure plate 60 and tubular shaft 16.

An end thrust-collar 71, attached to tubular shaft 16 is provided with a thrust-bearing 72, and is located between case extension 55 and clutch pressure plate 58 to take the thrust pressure exerted on the friction clutch.

A pressure plate return spring 65 is located between pressure plate 60 and pressure plate hub 63 to maintain these plates in a complete disengaged position while the speed of the engine is under idling speed, and to permit their engagement when the engine is above idling speed.

Figure 2:
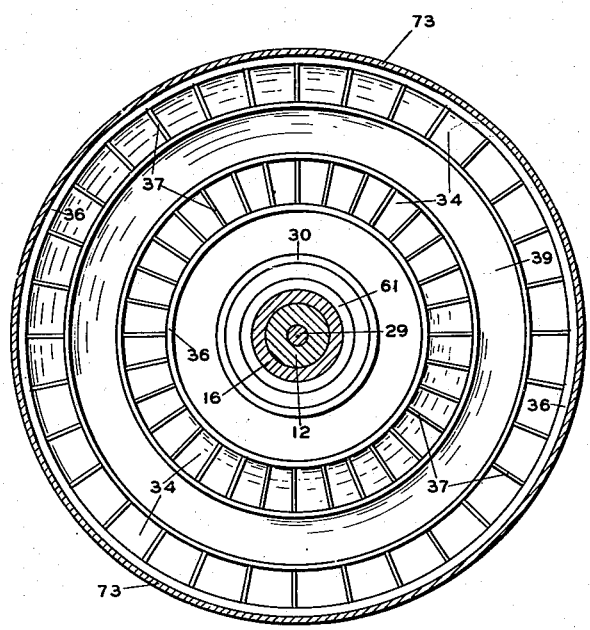
Fig. 2 shows a cross-section between two torus fluid members through lines 3—3, Fig. 1.

A multi-action torus fluid shell 36 is attached to support 30, which is independently mounted upon tubular shaft 16, and attached to pressure plate 60; it is provided with a projecting flange 73 on its outer edge, and has vanes 37 welded radially in the shell 36, forming radial cells 34. A torus channeled ring 39, Figs. 1 and 2, is embedded in the vanes 37, and is concentric with the aforementioned shell 36. I shall call this assembly, constituted of parts 30, 36, 37 and 39, Figs. 1 and 2, multi-action torus member D.

A driving torus fluid shell 26, attached to the tubular shaft 16 by means of support 27 is located in the rear and facing the above mentioned member D. This member shell 26 has vanes 28 welded radially in it, forming radial cells 34. I shall call this assembly, constituted of parts 26, 27 and 28, Figs. 1 and 2, driving torus member B.

The projecting flange 73 of shell 36, projects and rotates over the outer edge of shell 26, with the object of maintaining the closest gap possible between the outer edges of the shells of torus members D and B, in all operating conditions.

I call torus fluid member D, multi-action torus member D because of its compounded working action; it will produce a braking action on torus member B, to provide the intermediate speed gear drive, and at the same time it will produce the engagement of the friction discs clutch, by its side displacing action, whereby case 1 is held to provide the low speed gear drive, and also is driven by torus member B, when this rotates in the direction of drive shaft 2.

A torus cover 41 is attached to the outer edge of the multi-action torus member D, and is attached at its small end to the hub 54, which is provided with an oil retainer 43.

An internally splined member 66 of a conventional type over-running brake is mounted upon an externally splined hub 54 for rotation therewith, and yet being able to displace laterally upon said hub. The external member 67 of this over-running brake is attached to the chassis support 14. This will hold cover 41 from turning in the opposite direction to shaft 2, and release it in its direction of rotation.

The cover 41 is provided with filler plugs, not shown in the drawings, and is partly filled with fluid.

The above mentioned torus fluid members consist of two elements that form a pair or complete unit, members D and B, which revolve with no mechanical connection between the two elements.

The motion of the fluid driving member B around its own axis causes the fluid to rotate around the same axis. Being acted upon by centrifugal force and owing to the shape of the cells 34 the fluid also rotates around an axis which is circular and at right angles to the axis of rotation of the driving member. As the fluid flows from the cells 34 of the driving torus member B to the cells 34 of the multi-action torus member D it impinges on the walls of the cells of this member. It is this combination of rotation and spiral motion of the fluid between the two members that tends to cause the braking action on the driving torus member B. Furthermore, being acted upon by centrifugal force, a high fluid pressure will be developed between the two fluid members D and B, which will produce a side displacement of torus member D, that is utilized to engage the clutch pressure plate 60 to pressure plate 58.

When the driving speed is very low, the combined forces acting on the fluid causes the fluid to move outward, through the driving member cells and it then returns to the starting point, with no appreciable pressure. However, the baffle ring 39, placed between the two elements also interferes with the flow of fluid, reducing the actuating effort or torque to such point that the transmission shaft 12 will not move, and the side displacing action of torus member D will be negligible. When the driving torus member B is rotating at higher speed the forces acting are greater and the fluid enters the multi-action torus member D cells under much greater force and speed, and a high fluid pressure will be developed inside torus members D and B. The baffle ring 39 is no longer effective as the force has moved the fluid out of the range of the baffle ring and the fluid becomes a revolving mass. As soon as the speed is high enough to cause this condition outside the range of the baffle ring it will actuate on the multi-action torus member D.

The driving torus member B, attached to tubular shaft 16 is gradually stopped by the fluid braking action of the multi-action torus member D which will act as a brake at that moment, due to its being connected to the chassis support 14, through the above mentioned over-running brake unit 66—67, cover hub 54, cover 41 and support 30.

The case 1 together with radial axles 9 are gradually stopped by the braking action of the friction disc clutch unit, which will act as a brake at that moment due to its being connected to the chassis support 14, through the mentioned over-running brake unit 66—67, cover hub 54, cover 41 and pressure plate 60. The engagement of the friction clutch is provided by the side displacement of torus member D, actuated by the fluid pressure developed inside the two torus members, D and B, by the centrifugal force exerted by the fluid in either torus member B or D.

A torus fluid shell 23 is attached to the front of case 1, to rotate therewith, and has vanes 24 welded radially in the shell 23, forming radial cells 34. A channeled ring 35 is embedded in the vanes 24, and is concentric with the aforementioned torus shell 23. I shall call this assembly, constituted by parts 23, 24 and 35, Figs. 1 and 2, torus member A.

A torus fluid shell 32, independently mounted upon tubular extension 4, by means of support 31 is located in front and facing the mentioned torus member A. This torus member shell 32 has vanes 33 welded radially in it, forming radial cells 34. I shall call this assembly, constituted of parts 31, 32 and 33, Figs. 1 and 2, double-action torus member C.

A torus cover 40, attached to the outer edge of torus member shell 23 to rotate therewith, and its small end bears upon the hub 22 of support 31, and is provided with oil retainer 42. This cover is provided with filler plugs, not shown in the drawings, and is partly filled with fluid.

A projecting flange 75 of torus shell 23, projects around and rotates over the outer edge of torus shell 32, with the object of maintaining the closest gap possible between the outer edges of the torus shells of members C and A, in all operating conditions.

A clutch pressure plate 76 is attached to the hub 22 of support 31 to move therewith.

Another clutch pressure plate 77 is attached on the tubular extension 4 of drive shaft 2 to rotate therewith, and is located in front of plate 76.

I call torus member C, double-action torus member C because of its compounded working action; it will produce the engagement of the friction clutch pressure plates 76—77, by its side displacing action, whereby it will become connected to the drive shaft 2, thereby producing a fluid coupling action upon torus member A.

A pressure plates return spring 78 is located between the two pressure plates 76 and 77 to maintain these plates in a complete disengaged position while the speed of the engine and the transmission case 1 are under idling speed, and permitting its engagement when the speed of the engine or the transmission case 1 is above idling speed.

The above mentioned torus members consist of two elements that form a pair or complete unit, torus members A and C, which revolve with no mechanical connection between the two elements.

The motion of the fluid torus member A around its axis causes the fluid to rotate around the same axis. Being acted by centrifugal force, a high fluid pressure will be developed between the two torus members A and C, which will produce a side displacement of the torus member C, that is utilized to engage the clutch pressure plate 76 to pressure plate 77, and thus its engagement with the drive shaft 2.

Being acted upon by centrifugal force and owing to the shape of the cells 34 the fluid will also rotate around an axis which is circular and at right angles to the axis of rotation of the torus member C. As the fluid flows from the cells 34 of the torus member C to the cells 34 of the torus member A, it impinges on the walls of the cells of this member. It is this combination of rotation and spiral motion of the fluid between the two torus members that causes the driving action upon torus member A, to produce the direct-drive of drive shaft 2 and transmission shaft 12, through a fluid coupling.

A brake friction band 74, pivoted on frame support 79 is located around the cylindrical portion of case 1. This case will serve as a brake drum, to operate in either turning direction, to provide the reverse drive of the transmission shaft 12 when the reverse drive pinion 19 is engaged to shaft 12, while the forward drive pinion 15 is in disengaged position; and as an emergency low-speed-gear-drive when the forward drive pinion 15 is engaged to shaft 12, while the reverse drive pinion 19 is in disengaged position.

The whole transmission assembly is supported upon shaft 12, said shaft rests on supports 13 and 14, through bearings 20 and 21.

FUNCTIONING

Independent action of each of the gear-ratios acting upon the transmission shaft 12 will now be described.

*Low speed gear drive.*—Supposing that drive shaft 2 is rotating, transmission shaft 12 is stationary, and the forward drive pinion 15 is engaged to shaft 12, then when gears 6 receive the stress from pinion 5, they will act as levers upon their axles 9, having as a fulcrum the gearing points b on the gears 7 with the pinion 15, which is stationary, and will cause radial axles 9 to rotate, causing the case 1 and so the friction clutch pressure plate 58 to turn in the opposite direction and at much less speed that of shaft 2. In this condition, if by means of the engagement of the friction clutch unit 58—60, which will act as a brake at that moment—due to its being connected to the chassis support 14, through the over-running brake unit 66—67, cover hub 54, cover 41 and friction clutch pressure plate 60— the case 1 is held, that is, its speed is lowered without altering the speed of the shaft 2, we shall have that the difference of motion will be transmitted to pinion 15, therefore to shaft 12, which will increase until reaching the speed and power equivalent to low-gear-drive. The engagement of this friction clutch unit 58—62—59—60 is provided by the side displacing action of clutch pressure plate 60 together with torus member D, which is actuated by the fluid pressure developed inside the two torus members, D and B, due to the centrifugal force exerted by the fluid, in rotating either torus member. The torus member B being at this time driven reversely by the bevel gear 17, so that pressure is built up in the fluid coupling.

*Intermediate speed gear drive.*—Supposing that drive shaft 2 is rotating, transmission shaft 12 is stationary, and the forward drive pinion 15 is engaged to shaft 12, then when gears 6 receive the stress from pinion 5, they will act as levers upon gearing points *d* of pinion 17 and gears 6, having as a fulcrum the gearing points *b* on the gears 7 with pinion 15, which is stationary, and will cause pinion 17 together with the tubular shaft 16 and the torus fluid driving member B to rotate in the opposite direction and at much higher speed that of the shaft 2. In this condition, if by means of the multi-action torus member D which will act as a brake at that moment—due to its being connected to the chassis support 14, through the over-running brake unit 66—67, cover hub 54, cover 41 and support 30—the torus fluid driving member B together with tubular shaft 16 and pinion 17 is held, that is, its speed is lowered, without altering the speed of shaft 2, we shall have that the difference of motion will be transmitted to pinion 15, therefore to shaft 12. As the pinion 17 is gradually braked, the speed of shaft 12 will increase until reaching the speed and power equivalent to an intermediate-gear-drive.

*Direct-drive coupling.*—Supposing that drive shaft 2 is rotating, transmission shaft 12 is stationary, and the forward drive pinion 15 is engaged to shaft 12, then when gears 6 receive the stress from pinion 5, they will act as levers upon their axles 9, having as a fulcrum the gearing points *b* on the gears 7 with the pinion 15, which is stationary, and will cause the radial axles 9 to revolve, causing the case 1 to rotate in the opposite direction and at much less speed that of the shaft 2. In this condition, if by means of the rotation of the torus member C, the torus member A is driven together with case 1, an interlocking will be produced by the following parts; pinion 5, gears 6, gears 7, pinion 15; radial axles 9 together with case 1, which will provide the direct-drive of drive shaft 2 and transmission shaft 12, through the fluid coupling A—C.

*Automatic combining operations of the three gear ratios acting upon transmission shaft 12*

As is seen, when drive shaft 2 together with clutch pressure plate 77 is rotating, and transmission shaft 12 is stationary, the driving torus member B will rotate in the reverse direction and at much higher speed that of shaft 2, and case 1 together with clutch pressure plate 58 and torus member A will also rotate in the reverse direction, but at much less speed that of shaft 2. When the rotation of the engine is under idling speed, or any predetermined low speed, the braking action on torus member B, side displacing action of multi-action torus member D, and the engagement of torus member C to drive shaft 2 will be null. As soon as the engine speed surpasses the predetermined speed, a braking action will be effected on torus member B, by the centrifugal force upon the fluid exerted by its own motion upon the multi-action torus member D, that will produce an intermediate gear torque upon shaft 12. At the same time, the centrifugal force exerted by the fluid on torus member B will also produce a side displacement of multi-action torus member D— which will be controlled by the tension of plate 75 return spring 85—that will be utilized to connect this latter torus member with the transmission case 1, to produce a low gear torque upon shaft 12. The torus member C will continue being disengaged from drive shaft 2 due to lack of speed of torus member A.

When the resistance of shaft 12 is great, the driving torus member B, which operates the intermediate gear ratio will slip due to the excessive stress, then the motion of the driving torus member B will develop a high fluid pressure inside the unit D—B that will displace multi-action torus member D, and the stress is taken, mechanically by the friction discs clutch, which will hold the transmission case 1 that is being turning in the opposite direction of drive shaft 2, by means of the over-running clutch unit 56—57. As soon as the intermediate speed gear ratio has sufficient power to overcome the resistance of shaft 12, the transmission case 1 will be released from the friction discs clutch, by means of the over-running clutch unit 56—57, which will release it in the direction of rotation of drive shaft 2, and the resistance of shaft 12 is taken by the intermediate gear drive by means of the braking action upon torus member B, then as the shaft 12 progressively releases resistance and thus gains speed, the transmission case 1 will also rotate in the direction of drive shaft 2, and will gain enough speed, together with torus member A to exert a centrifugal force by this latter torus member to develop a high fluid pressure inside the torus unit A—C that will produce a side displacement of double-action torus member C, thus engaging this torus member C with drive shaft 2 through clutch pressure plates 76—77. As soon as the direct-drive coupling has sufficient power to overcome the resistance of shaft 12, the multi-action torus member D will be released from the chassis support 14, by means of the over-running brake 66—67, and the stress is taken by the direct-drive fluid coupling action of torus member C and A, that will produce the interlocking of transmission shaft 12 and transmission case 1, thus effecting the direct-drive of drive shaft 2 and shaft 12.

*Reverse gear drive.*—Supposing that drive shaft 2 is rotating, transmission shaft 12 is stationary, and the reverse pinion 19 is engaged to it, then when gears 6 receive the stress from pinion 5, they will act as levers upon their axles 9, having as a fulcrum the gearing points *c* on the gears 7 with the pinion 19, which is stationary, and will cause the radial axles 9 to revolve, causing the case 1 to release its grip from pressure plate 58, by means of the over-running clutch unit 56—57, and to turn in the direction and at much less speed that of shaft 2. In this condition, if by means of the brake friction band acting upon case 1, this is held, that is, its speed is lowered without altering the speed of the shaft 2, we shall have that the difference of motion will be transmitted to the pinion 19, therefore to shaft 12, thus effecting a reverse low gear drive.

*Emergency low gear drive.*—Supposing that drive shaft 2 is rotating, transmission shaft 12 is stationary, and the forward drive pinion 15 is engaged to it, then when gears 6 receive the stress from pinion 5, they will act as levers upon their axles 9, having as a fulcrum the gearing points *b* on the gears 7 with the pinion 15, which is stationary, and will cause the radial axles 9 to revolve, causing the case 1 and so the friction clutch pressure plate 58 to turn in the opposite direction and at much less speed that of shaft 2. In this condition, if by means of the brake friction band 74 acting upon case 1, this is held, that is, its speed is lowered without altering the speed of drive shaft 2, we shall have that the difference of motion will be transmitted to the pinion 15, therefore to shaft 12, until reaching the speed and power equivalent to a forward low gear drive.

I claim:

1. In a differential transmission the combination of a drive shaft; a transmission shaft coaxial with the drive shaft; supporting means applied at two points within the length of the transmission shaft; a transmission case independently rotatable upon the shafts; bevel gears rotatable in the transmission case on axes arranged radially to the axis of the shafts; bevel gears of lesser diameter attached in the inner side of the bevel gears for rotation therewith; a bevel pinion carried by the drive shaft in meshing relation with the large bevel gears for drive of the same; a bevel pinion independently rotatable upon the transmission shaft in meshing relation with the small bevel gears, this meshing being at the same side of their axes of rotation with regard to the above mentioned meshing; means to fix this bevel pinion to the transmission shaft to rotate therewith; means for releasably holding the transmission case stationary for effecting forward low speed drive; a clutch member attached on the drive shaft; a second clutch member independently mounted upon the drive shaft and located between the above-mentioned clutch member and the transmission case; a double-action torus fluid member attached to the second mentioned clutch member to move therewith and facing the transmission case; a second torus fluid member attached to the front end of the transmission case and facing the double-action torus fluid member; means providing a side displacement of the double-action torus fluid member for causing the engagement of the first mentioned clutch members to provide a coupling action between the double-action torus fluid member and the drive shaft; means providing a fluid coupling action between these two torus fluid members for effecting a direct-drive of the drive shaft and the transmission shaft; a cover attached to the second mentioned torus fluid member for maintaining the fluid inside these two members.

2. In a differential transmission the combination of a drive shaft; a transmission shaft coaxial with the drive shaft; supporting means applied at two points within the length of the transmission shaft; a transmission case independently rotatable upon the shafts; bevel gears rotatable in the transmission case on axes arranged radially to the axis of the shafts; bevel gears of lesser diameter attached in the inner side of the first bevel gears for rotation therewith; a bevel pinion carried by the drive shaft in meshing relation with the large bevel gears for drive of the same; a bevel pinion independently rotatable upon the transmission shaft in meshing relation with the small bevel gears, but at the opposite side from their axes of rotation with regard to the above mentioned meshing; means to fix this pinion to the transmission shaft to rotate therewith; means for releasably holding the transmission case stationary for effecting low reverse drive; a clutch member attached on the drive shaft; a second clutch member independently mounted upon the drive shaft and located between the above mentioned clutch member and the transmission case; a double-action torus fluid member attached to the second mentioned clutch member to move therewith and facing the transmission case; a second torus fluid member attached to the front end of the transmission case and facing the double-action torus fluid member; means providing a side displacement of the double-action torus fluid member for causing the engagement of the first mentioned clutch members to provide a coupling action between the double-action torus fluid member and the drive shaft; means providing a fluid coupling action between these two torus fluid members for effecting a direct-drive of the drive shaft and the transmission shaft; a cover attached to the second mentioned torus fluid member for maintaining the fluid inside these two fluid members.

3. In a differential transmission the combination of a drive shaft; a transmission shaft coaxial with the drive shaft; supporting means applied at two points within the length of the transmission shaft; a transmission case independently rotatable upon the shafts; bevel gears rotatable in the transmission case on axes arranged radially to the axis of the shafts; bevel gears of lesser diameter attached in the inner side of the first bevel gears for rotation therewith; a bevel pinion carried by the drive shaft in meshing relation with the large bevel gears for drive of the same; a bevel pinion independently rotatable upon the transmission shaft in meshing relation with the small bevel gears, this meshing being at the same side of their axes of rotation with regard to the above mentioned meshing; means to fix this bevel pinion to the transmission shaft to rotate therewith; means for releasably holding the transmission case stationary for effecting forward low speed drive; another bevel pinion independently rotatable upon the transmission shaft in meshing relation with the small bevel gears; but at the opposite side from their axes of rotation with regard to the above mentioned meshings; means to fix this bevel pinion to the transmission shaft to rotate therewith; means for releasably holding the transmission case stationary for effecting low reverse speed drive; a clutch member attached on the drive shaft; a second clutch member independently mounted upon the drive shaft and located between the above mentioned clutch member and the transmission case; a double-action torus fluid member attached to the second mentioned clutch member to move therewith and facing the transmission case; a second torus fluid member attached to the front end of the transmission case and facing the double-action torus fluid member; means providing a side displacement of the double-action torus fluid member for causing the engagement of the first mentioned clutch members to provide a coupling action between the double-action torus fluid member and the drive shaft; means providing a fluid coupling action between these two torus fluid members for effecting a direct-drive of the drive shaft and the transmission shaft; a cover attached to the second mentioned torus fluid member for maintaining the fluid inside these two fluid members.

4. In a differential transmission the combination of a drive shaft; a transmission shaft coaxial with the drive shaft; supporting means applied at two points within the length of the transmission shaft; a transmission case independently rotatable upon the shafts; bevel gears rotatable in the transmission case on axes arranged radially to the axis of the shafts; bevel gears of lesser diameter attached in the inner side of the first bevel gears for rotation therewith; a bevel pinion carried by the drive shaft in meshing relation with the large bevel gears for drive of the same; a bevel pinion independently rotatable upon the transmission shaft in meshing relation with the small bevel gears, this meshing being at the same side of their axes of rotation with regard to the above mentioned meshing; means to fix this bevel pinion in the transmission shaft to rotate therewith; means for releasably holding the transmission case stationary for effecting an emergency forward low speed drive; a tubular shaft independently rotatable upon the transmission shaft; a bevel pinion carried by the tubular shaft in engagement with the large bevel gears at the opposite side of their axes of rotation with regard to the first mentioned meshings; a clutch driving member independently rotatable upon the aforementioned tubular shaft and located at the rear end of the transmission case; means to fix this clutch member to the transmission case in one turning direction and release it in the opposite turning direction; a clutch driven member independently mounted upon the above mentioned tubular shaft and located in front and facing the first mentioned clutch driving member; a multi-action torus fluid member attached to the clutch driven member to move therewith; a torus fluid driving member attached on the outer end of the above mentioned tubular shaft and located in front and facing the multi-action torus fluid member; means to brake this multi-action torus fluid member in one turning direction and release it in the opposite turning direction for fluidly braking the torus fluid driving member and thereby the mentioned tubular shaft against rotation for effecting an intermediate speed drive; means providing a side displacement of the multi-action torus fluid member for causing the engagement of the first mentioned clutch members to provide a braking action upon the transmission case for effecting a low speed drive; a cover attached on the mentioned multi-action torus fluid member for maintaining the fluid inside these fluid members.

5. In a differential transmission the combination of a drive shaft; a transmission shaft coaxial with the drive shaft; supporting means applied at two points within the length of the transmission shaft; a transmission case independently rotatable upon the shafts; bevel gears rotatable in the transmission case on axes arranged radially to the axis of the shafts; bevel gears of lesser diameter attached in the inner side of the first bevel gears for rotation therewith; a bevel pinion carried by the drive shaft in meshing relation with the large bevel gears for drive of the same; a bevel pinion independently rotatable upon the transmission shaft in meshing relation with the small bevel gears, but at the opposite side from their axes of rotation with regard to the above mentioned meshing; means to fix this pinion to the transmission shaft to rotate therewith; means for releasably holding the transmission case stationary for effectnig a low reverse drive; a tubular shaft independently rotatable upon the transmission shaft; a bevel pinion carried by the tubular shaft in engagement with the large bevel gears at the opposite side of their axes of rotation with regard to the first mentioned meshings; a clutch driving member independently rotatable upon the aforementioned tubular shaft and located at the rear end of the transmission case; means to fix this clutch member to the transmission case in one turning direction and release it in the opposite turning direction; a clutch driven member independently mounted upon the above mentioned tubular shaft and located in front and facing the first mentioned clutch driving member; a multi-action torus fluid member attached to the clutch driven member to move therewith; a torus fluid driving member attached on the other end of the above mentioned tubular shaft and located in front and facing the multi-action torus fluid member; means to brake this multi-action torus fluid member in one turning direction and release it in the opposite turning direction for fluidly braking the torus fluid driving member and the mentioned tubular shaft against rotation for effecting an intermediate speed drive; means providing a side displacement of the multi-action torus fluid member for the engagement of the first mentioned clutch members to provide a braking action upon the transmission case for effecting a low speed drive; a cover attached on the mentioned multi-action torus fluid member for maintaining the fluid inside these fluid members.

6. In a differential transmission the combination of a drive shaft; a transmission shaft coaxial with the drive shaft; supporting means applied at two points within the length of the transmission shaft; a transmission case independently rotatable upon the shafts; bevel gears rotatable in the transmission case on axes arranged radially to the axis of the shafts; bevel gears of lesser diameter attached in the inner side of the first bevel gears for rotation therewith; a bevel pinion carried by the drive shaft in meshing relation with the large bevel gears for drive of the same; a bevel pinion independently rotatable upon the transmission shaft in meshing relation with the small bevel gears, this meshing being at the same side of their axes of rotation with regard to the above mentioned meshing; means to fix this bevel pinion to the transmission shaft to rotate therewith; means for releasably holding the transmission case stationary for effecting an emergency forward low speed drive; another bevel pinion independently rotatable upon the transmission shaft in meshing relation with the small bevel gears, but at the opposite side from their axes of rotation with regard to the above mentioned meshings; means to fix this bevel pinion to the transmission shaft to rotate therewith; means for releasably holding the transmission case stationary for effecting a low reverse speed drive; a tubular shaft independently rotatable upon the transmission shaft; a bevel pinion carried by the tubular shaft in engagement with the large bevel gears at the opposite side of their axes of rotation with regard to the first mentioned meshings; a clutch driving member independently rotatable upon the aforementioned tubular shaft and located at the rear end of the transmission case; means to fix this clutch member to the transmission case in one turning direction and release it in the opposite turning direction; a clutch driven member independently mounted upon the above mentioned tubular shaft and located in front and facing the first mentioned clutch driving member; a multi-action torus fluid member attached to the clutch driven member to move therewith; a torus fluid driving member attached on the other end of the above mentioned tubular shaft and located in front and facing the multi-action torus fluid member; means to brake this multi-action torus fluid member in one turning direction and release it in the opposite turning direction for fluidly braking the torus fluid driving member and the mentioned tubular shaft against rotation for effecting an intermediate speed drive; means providing a side displacement of the multi-action torus fluid member for the engagement of the first mentioned clutch members to provide a braking action upon the transmission case for effecting a low speed drive; a cover attached on the mentioned multi-action torus fluid member for maintaining the fluid inside these fluid members.

7. In a differential transmission the combination of a drive shaft; a transmission shaft coaxial with the drive shaft; supporting means applied at two points within the length of the transmission shaft; a transmission case independently rotatable upon the shafts; bevel gears rotatable in the transmission case on axes arranged radially to the axis of the shafts; bevel gears of lesser diameter attached in the inner side of the first bevel gears for rotation therewith; a bevel pinion carried by the drive shaft in meshing relation with the large bevel gears for drive of the same; a bevel pinion independently rotatable upon the transmission shaft in meshing relation with the small bevel gears, this meshing being at the same side of their axes of rotation with regard to the above mentioned meshing; means to fix this bevel pinion to the transmission shaft to rotate therewith; means for releasably holding the transmission case stationary for effecting an emergency forward low speed drive; a tubular shaft independently rotatable upon the transmission shaft; a bevel pinion carried by the tubular shaft in engagement with the large bevel gears at the opposite side of their axes of rotation with regard to the first mentioned meshings; a clutch member attached on the drive shaft; a second clutch member independently mounted upon the drive shaft and located between the above mentioned clutch member and the transmission case; a double-action torus fluid member attached to the second mentioned clutch member to move therewith and facing the transmission case; a second torus fluid member attached to the front end of the transmission case and facing the double-action torus fluid member; means providing a side displacement of the double-action torus fluid member for causing the engagement of the first mentioned clutch members to provide a coupling action between the double-action torus fluid member and the drive shaft; means providing a fluid coupling action between these two torus fluid members for effecting a direct-drive of the drive shaft and the transmission shaft; a cover attached to the second mentioned torus fluid member for maintaining the fluid inside these two fluid members; a clutch driving member independently rotatable upon the aforementioned tubular shaft and located at the rear end of the transmission case; means to fix this clutch member to the transmission case in one turning direction and release it in the opposite turning direction; a clutch driven member independently mounted upon the above mentioned tubular shaft and located in front and facing the first mentioned clutch driving member; a multi-action torus fluid member attached to the clutch driven member to move therewith; a torus fluid driving member attached on the outer end of the above mentioned tubular shaft and located in front and facing the multi-action torus fluid member; means to brake this multi-action torus fluid member in one turning direction and release it in the opposite turning direction for fluidly braking the torus fluid driving member and the mentioned tubular shaft against rotation for effecting an intermediate speed drive; means providing a side displacement of the multi-action torus fluid member for the engagement of the first mentioned clutch members to provide a braking action upon the transmission case for effecting a low speed drive; a cover attached on the mentioned multi-action torus fluid member for maintaining the fluid inside these fluid members.

8. In a differential transmission the combination of a drive shaft; a transmission shaft coaxial with the drive shaft; supporting means applied at two points within the length of the transmission shaft; a transmission case independently rotatable upon the shafts; bevel gears rotatable in the transmission case on axes arranged radially to the axis of the shafts; bevel gears of lesser diameter attached in the inner side of the first bevel gears for rotation therewith; a bevel pinion carried by the drive shaft in meshing relation with the large bevel gears for drive of the same; a bevel pinion independently rotatable upon the transmission shaft in meshing relation with the small bevel gears, but at the opposite side from their axes of rotation with regard to the above mentioned meshing; means to fix this pinion to the transmission shaft to rotate therewith; means for releasably holding the transmission case stationary for effecting low reverse drive; a tubular shaft independently rotatable upon the transmission shaft; a bevel pinion carried by the tubular shaft in engagement with the large bevel gears at the opposite side of their axes of rotation with regard to the first mentioned meshings; a clutch member attached on the drive shaft; a second clutch member independently mounted upon the drive shaft and located between the above mentioned clutch member and the transmission case; a double-action torus fluid member attached to the second mentioned clutch member to move therewith and facing the transmission case; a second torus fluid member attached to the front end of the transmission case and facing the double-action torus fluid member; means providing a side displacement of the double-action torus fluid member for causing the engagement of the first mentioned clutch members to provide a coupling action between the double-action torus fluid member and the drive shaft; means providing a fluid coupling action between these two torus fluid members for effecting a direct-drive of the drive shaft and the transmission shaft; a cover attached to the second mentioned torus fluid member for maintaining the fluid inside these two fluid members; a clutch driving member independently rotatable upon the aforementioned tubular shaft and located at the rear end of the transmission case; means to fix this clutch member to the transmission case in one turning direction and release it in the opposite turning direction; a clutch driven member independently mounted upon the above mentioned tubular shaft and located in front and facing the first mentioned clutch driving member; a multi-action torus fluid member attached to the clutch driven member to move therewith; a torus fluid driving member attached on the outer end of the above mentioned tubular shaft and located in front and facing the multi-action torus fluid member; means to brake this multi-action torus fluid member in one turning direction and release it in the opposite turning direction for fluidly braking the torus fluid driving member and the mentioned tubular shaft against rotation for effecting an intermediate speed drive; means providing a side displacement of the multi-action torus fluid member for the engagement of the first mentioned cutch member to provide a braking action upon the transmission case for effecting a low speed drive; a cover attached on the mentioned multi-action torus fluid member for maintaining the fluid inside these fluid members.

9. In a differential transmission the combination of a drive shaft; a transmission shaft co-axial with the drive shaft; supporting means applied at two points within the length of the transmission shaft; a transmission case independently rotatable upon the shafts; bevel gears rotatable in the transmission case on axes arranged radially to the axis of the shafts; bevel gears of lesser diameter attached in the inner side of the first bevel gears for rotation therewith; a bevel pinion carried by the drive shaft in meshing relation with the large bevel gears for drive of the same; a bevel pinion independently rotatable upon the transmission shaft in meshing relation with the small bevel gears, this meshing being at the same side of their axes of rotation with regard to the above mentioned meshing; means to fix this bevel pinion to the transmission shaft to rotate therewith; means for releasably holding the transmission case stationary for effecting an emergency forward low speed drive; another bevel pinion independently rotatable upon the transmission shaft in meshing relation with the small bevel gears, but at the opposite side from their axes of rotation with regard to the above mentioned meshings; means to fix this bevel pinion to the transmission shaft to rotate therewith; means for releasably holding the transmission case stationary for effecting low reverse speed drive; a tubular shaft independently rotatable upon the transmission shaft; a bevel pinion carried by the tubular shaft in engagement with the large bevel gears at the opposite side of their axes of rotation with regard to the first mentioned meshings; a clutch member attached on the drive shaft; a second clutch member independently mounted upon the drive shaft and located between the above mentioned clutch member and the transmission case; a double-action torus fluid member attached to the second mentioned clutch member to move therewith and facing the transmission case; a second torus fluid member attached to the front end of the transmission case and facing the double-action torus fluid member; means providing a side displacement of the double-action torus fluid member for causing the engagement of the first mentioned clutch members to provide a coupling action between the double-action torus fluid member and the drive shaft; means providing a fluid coupling action between these two torus fluid members for effecting a direct-drive of the drive shaft and the transmission shaft; a cover attached to the second mentioned torus fluid member for maintaining the fluid inside these two fluid members; a clutch driving member independently rotatable upon the aforementioned tubular shaft and located at the rear end of the transmission case; means to fix this clutch member to the transmission case in one turning direction and release it in the opposite turning direction; a clutch driven member independently mounted upon the above mentioned tubular shaft and located in front and facing the first mentioned clutch driving member; a multi-action torus fluid member attached to the clutch driven member to move therewith; a torus fluid driving member attached on the other end of the above mentioned tubular shaft and located in front and facing the multi-action torus fluid member; means to brake this multi-action torus fluid member in one turning direction and release it in the opposite turning direction for fluidly braking the torus fluid driving member and the mentioned tubular shaft against rotation for effecting an intermediate speed drive; means providing a side displacement of the multi-action torus fluid member for the engagement of the first mentioned clutch members to provide a braking action upon the transmission case for effecting a low speed drive; a cover attached on the mentioned multi-action torus fluid member for maintaining the fluid inside these torus fluid members.

FRANCISCO F. LÁZAGA.

REFERENCES CITED

The following references are of record in the file of this patent:

UNITED STATES PATENTS

| Number | Name | Date |
|---|---|---|
| 864,903 | Morse | Sept. 3, 1907 |
| 1,610,284 | Hintze | Dec. 14, 1926 |
| 2,149,369 | Sinclair | Mar. 7, 1939 |
| 2,153,478 | Owen | Apr. 4, 1939 |
| 2,309,912 | Lázaga | Feb. 2, 1943 |
| 2,333,674 | Powell | Nov. 9, 1943 |
| 2,355,876 | Lázaga | Aug. 15, 1944 |